United States Patent [19]

Reber et al.

[11] Patent Number: 5,649,786
[45] Date of Patent: Jul. 22, 1997

[54] APPARATUS FOR DOWN HOLE FUSING

[75] Inventors: Cleve C. Reber, Pasadena; Kurt S. Myers, Houston, both of Tex.

[73] Assignee: TTI Trenchless Technologies, Inc., Conroe, Tex.

[21] Appl. No.: 339,335

[22] Filed: Nov. 14, 1994

Related U.S. Application Data

[63] Continuation-in-part of Ser. No. 38,148, Mar. 26, 1993, Pat. No. 5,364,207.

[51] Int. Cl.$^6$ ........................................... F16L 1/028
[52] U.S. Cl. .................... 405/154; 405/156; 138/97; 285/21.1; 219/524; 219/521; 219/535; 392/301; 156/433; 156/293; 156/71
[58] Field of Search ........................... 405/154, 156, 405/303; 138/97; 285/21; 219/524, 521, 534, 535, 385; 392/301; 156/71, 293, 303.1, 309.6, 322, 304.2, 433

[56] References Cited

U.S. PATENT DOCUMENTS

| | | | |
|---|---|---|---|
| 3,907,625 | 9/1975 | Vogelsanger | 285/21 X |
| 3,966,528 | 6/1976 | Christie | 156/293 |
| 4,357,961 | 11/1982 | Chick | 138/97 |
| 4,455,482 | 6/1984 | Grandclement | 285/21 X |
| 4,519,124 | 5/1985 | Burghardt | 405/154 X |
| 4,533,424 | 8/1985 | McElroy | 156/378 |
| 4,556,207 | 12/1985 | Thompson et al. | 269/41 |
| 4,832,069 | 5/1989 | Gale et al. | 405/154 X |
| 4,869,619 | 9/1989 | Akesaka | 405/154 |
| 4,894,521 | 1/1990 | Evans | 285/21 X |
| 5,076,730 | 12/1991 | Bergey | 405/154 |
| 5,364,207 | 11/1994 | Reber et al. | 405/303 |

FOREIGN PATENT DOCUMENTS

| | | | |
|---|---|---|---|
| 275983 | 11/1989 | Japan | 405/154 |

*Primary Examiner*—Ramon S. Britts
*Assistant Examiner*—Frederick L. Lagman

[57] ABSTRACT

The present invention is directed to a method for making service connection to polyethylene replacement sewer pipe. Specifically, the method involves the steps of (1) locating the service; (2) excavating an opening less than two feet in diameter from the surface to the polyethylene replacement pipe at the service; (3) introducing a fusing apparatus on top of the polyethylene pipe and fusing a stack to the polyethylene pipe; and (4) drilling a opening into the polyethylene pipe through the fused stack. Before drilling the opening into the polyethylene pipe, the stack may be tested to make certain that there are no leaks in the fusing step and that the stack is securely connected to the polyethylene pipe.

7 Claims, 5 Drawing Sheets

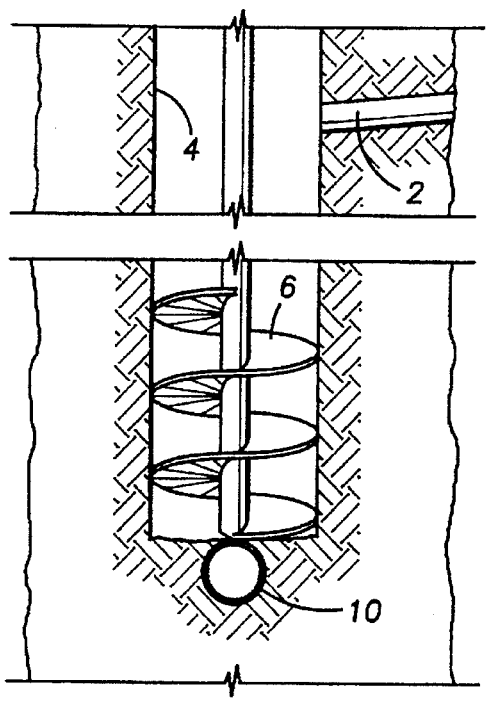
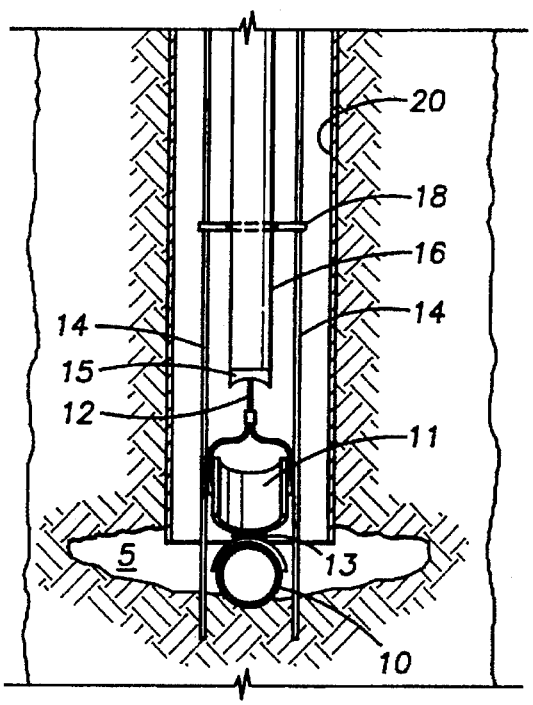
FIG. 1     FIG. 2
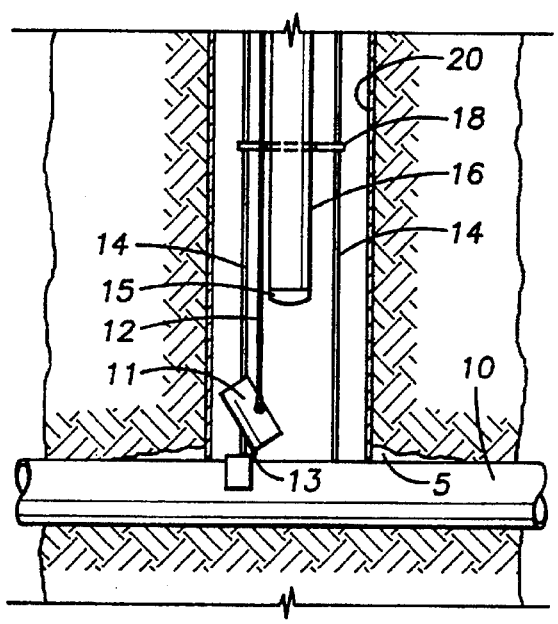
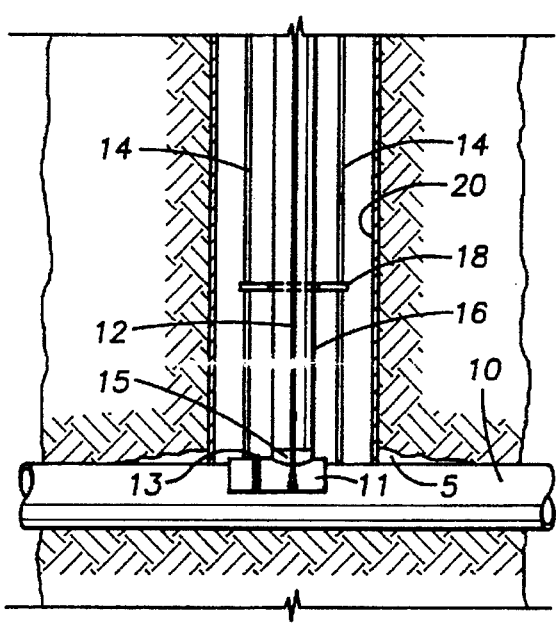
FIG. 3     FIG. 4

APPARATUS FOR DOWN HOLE FUSING

RELATED APPLICATION

This application is a continuation-in-part application of Ser. No. 08/038,148; filed Mar. 26, 1993 now U.S. Pat. No. 5,364,207; entitled "METHOD FOR MAKING SERVICE CONNECTIONS TO POLYETHYLENE PIPE".

FIELD OF THE INVENTION

The present invention is directed to an apparatus and method for down hole fusing to make connections to utility pipe. More specifically, the apparatus and method are directed to providing connections to a utility pipe, such as a water or sewer line of polyethylene pipe which may be new or replacement pipe for existing lines, and includes fusing a polyolefin service connection to the new pipe.

BACKGROUND OF THE INVENTION

The use of polyolefin pipe in the utility industry has become commonplace. The current accepted pipe is polyethylene pipe. Currently there are two basic methods used to repair existing lines such as broken sewer lines made of concrete or tile with polyethylene pipe. One is called slip lining which is pulling a smaller polyethylene pipe through an existing pipe. The other is a method which breaks the existing pipe and at the same time pulls in a polyethylene pipe. This latter method can maintain the pipe diameter at the same internal diameter with the replacing polyethylene pipe as was present in the broken pipe. These methods are being used by cities and municipalities to fix the infrastructure of their waste water systems. These projects are carried out on the city or municipality easements. However, both methods now require that the service connection, i.e. the connections from a house or business (the line or pipe on private property) be carried out usually in a pit which is 5 feet (5') to 12 feet (12') deep. Often these pits are in the backyards of person's homes and to allow sufficient room for a man to enter the pit, as many as 5 to 8 yards of dirt must be removed and stored. The available connectors for connecting the service connection or line to the new polyethylene pipe are saddles which are held onto the new polyethylene pipe by clamps. The clamps are very similar to the clamps used on hoses in a car but having much greater diameters since the lines are 8" to 12" in diameter. To the saddle connectors clamped to the new polyethylene pipe are a variety of polyvinylchloride (PVC) pieces which are connected to the service or private line to complete the service connection.

The problems with the current methods of making the service connections are many. They include the need to excavate large amounts of dirt to get to the site of the connection, disposal of the large amount of dirt removed and the pit needs to be shored to meet OSHA standards for working at levels greater than 5 feet deep. The use of saddles and clamps requires that access be obtained completely around the new polyethylene pipe and clamps cannot completely seal the saddle to prevent infusion of water which is passing on the outside of the polyethylene pipe, the intrusion of roots and the chance that the saddle is moved or disturbed during refilling the pit. Any one of these problems can make the connection a major and costly problem; collectively, these are each overcome by the apparatus and method of the present invention.

U.S. Pat. No. 4,647,073 discloses a clamping device for connecting a branch pipe to a main pipe buried underground. The clamp is lowered to the main pipe from the surface.

U.S. Pat. No. 4,832,069 discloses a method for tapping water mains by minimal excavation to expose the upper half of the main and then locating (with respect to the main) a conventional pipe tapping device but without employing means encircling the pipe.

U.S. Pat. No. 4,978,255 discloses a method for tapping a ferrous pipe through a saddle adhered to the surface of the pipe by an adhesive, the saddle having a closure member which prevents the adhesive entering the bore.

The patents are all related to methods used either with water or gas utility lines.

SUMMARY OF THE INVENTION

The present invention is directed to an apparatus and method for making service connections to polyolefin pipe. Specifically, the apparatus comprises a base which seats on a polyolefin pipe underground and has rods which extend to the surface of the ground; a heating element hinged to the base; a stack holder which holds the stack to be fused to the polyolefin pipe; and rods for raising and lowering the heating element from the surface of the ground. Specifically, the method involves the steps of (1) locating the service; (2) excavating an opening less than two feet in diameter from the surface to the polyolefin pipe at the service; (3) introducing a fusing apparatus on top of the pipe, usually polyethylene pipe and fusing a stack to the polyethylene pipe; and (4) drilling a opening into the pipe through the fused stack. Before drilling the opening into the pipe, the stack may be tested to make certain that there are no leaks in the fusing step and that the stack is securely connected to the pipe.

BRIEF DESCRIPTION OF THE DRAWINGS

FIG. 1 to FIG. 6 schematically illustrate the steps of the method of making a service connection to a polyethylene pipe:

FIG. 1 illustrates the locating and excavating steps;

FIG. 2 illustrates the introduction of the fusing apparatus onto the top of the polyethylene pipe and positioning the stack in preparation for fusing;

FIG. 3 illustrates the fusing apparatus with the heating element raised in a side view in relation to the polyethylene pipe and the stack positioned before fusing;

FIG. 4 illustrates the heating element on top of the polyethylene pipe and the stack on the top surface of the heating element in preparation for fusing;

FIG. 5 illustrates the completion of the fusing of the stack to the polyethylene pipe with the heating element of the fusing apparatus retracted for removal and the testing of the stack to make certain that there are no leaks in the fusing step; and FIG. 6 illustrates the drilling of the opening into the polyethylene pipe through the stack.

BRIEF DESCRIPTION OF THE PREFERRED EMBODIMENTS

Figure 5:
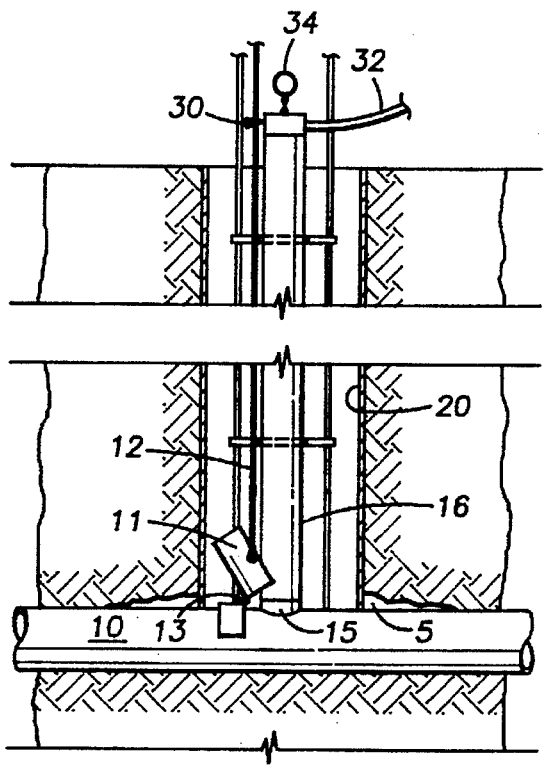
Figure 6:
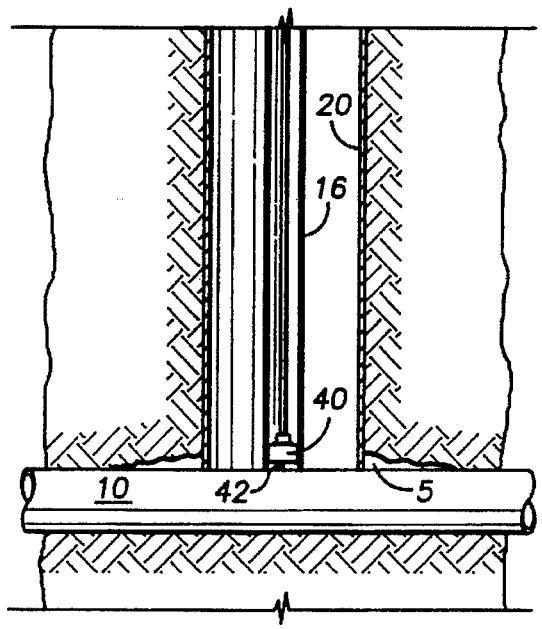

The apparatus of the present invention is used in the method for making service connections to polyethylene pipe involving the following steps: (1) locating the service; (2) excavating an opening less than two feet in diameter from the surface to the polyethylene pipe at the service; (3) introducing a fusing apparatus on top of the polyethylene pipe and fusing a polyethylene stack to the polyethylene pipe; and (4) drilling a opening into the polyethylene pipe through the fused stack. The method may further include testing the polyethylene stack to make certain that there are no leaks in the fusing step between the stack and the polyethylene pipe and that the stack is securely connected to the polyethylene pipe before drilling the opening into the polyethylene pipe. To more particularly point out the details of the fusing step, the sub-steps of step (3) may include (3a) introducing the heating element and supporting structure of the fusing apparatus into the excavation over the polyethylene pipe; (3b) positioning the stack within the supporting structure; (3c) positioning the heating element on the upper surface of the polyethylene pipe and the stack on the upper portion of the heating element to heat the upper surface of the polyethylene pipe and the lower end of the stack; (3d) raising the stack and then the heating element and quickly lowering the stack onto the heated portion of the polyethylene pipe; and applying pressure to the stack until the fusion of the polyethylene stack to the polyethylene pipe is complete.

Currently the two basic methods used to repair existing lines such as broken sewer lines made of concrete or tile with polyethylene pipe are a method called slip lining which is pulling a smaller polyethylene pipe through the existing pipe or methods which break the existing pipe and at the same time pull in a polyethylene pipe. These methods replace broken pipe with polyethylene pipe and are carried out on the city or municipality easements either in front of or behind homes and business. In the slip line method, there are no connections to the new polyethylene pipe until the old, existing line is broken and a new connection made. In the methods which break the old sewer pipe, the old connections are also broken. It is now required by the current methods employed to make the new connection, i.e. the connections from a house or business (the line or pipe on private property), in a pit which is 5 feet (5') to 12 feet (12') deep. Often these pits are in the backyards of person's homes and to allow sufficient room for a man to enter the pit to make the connection by hand, as many as 5 to 12 yards of dirt must be removed and stored. The problems of making these new service connections, which are set forth hereinabove, are overcome by the method which will be described in detail with reference to the drawings.

Referring now to FIGS. 1 to 6, the method is schematically illustrated and is described in a situation where an old sewer line has been replaced/repaired by a new polyethylene pipe. The service is made with a polyethylene stack. A service 2, which was connected to a broken sewer line and replaced by polyethylene pipe 10, is located. For example, if a block of homes has a sewer line running down an easement behind the houses, the replacement polyethylene pipe 10 will replace the old sewer line to which all the homes on two streets having common back yards were connected. In replacing the old sewer line each line or service from each house will be broken, either to make the connection or by the method used to replace the old sewer pipe. A common way of locating each service is televising the broken sewer line before it is replaced with the polyethylene pipe and recording the distance from the starting point of the television camera to each service. Measuring the distances on the surface from the starting point but above and along the old sewer line will locate the services, If televising is not used, then the sewer line coming from each house is located and followed to the intersection of the old sewer line, usually by digging in the back yard after finding the sewer connection at the house. Since sewer systems are gravity flow, the lines or services coming from each house usually start very shallow and drop several feet, while the sewer line may be 5 to 12 feet deep depending on the subdivision. The last portion of the pipe from the private property to the sewer line in the easement is usually a vertical drop.

FIG. 1 illustrates the locating of the service 2 and the excavating of an opening 4 less than two feet in diameter above the polyethylene pipe 10. It is understood that the method is identical in new construction, except locating the service is locating where it is desired to be rather than where it is. The excavation is preferably done with an auger 6 attached to a power unit, which will be described in detail hereinafter. A preferred diameter for the opening 4 is 18" or 1.5 feet, and if five feet of dirt is removed only a little over one-third (⅓) cubic yard of dirt requires storing and if ten feet of dirt is removed less than three quarters (¾) cubic yards need to be handled. In the method of the present invention all operations are carried out from the surface, not requiring anyone to enter the excavation or opening 4. The opening 4 may be directly over the polyethylene pipe 10 or at the 12 o'clock position in relationship to the polyethylene pipe 10 as shown in FIG. 1. However, the opening 4 may be at an angle such that the relationship between the opening 4 and the polyethylene pipe 10 is between the 10 and 2 o'clock positions as shown in FIG. 1. It is preferred that the sides of the opening 4 are at approximately 90° to the polyethylene pipe 10. The space around the pipe 10 needs to be cleaned. One alternative is to provide an enlarged portion or undercut portion to the opening 4 just above the polyethylene pipe 10 which allows space for dirt around the pipe or material, such as broken sewer pipe, to be pushed into. Augers or hand equipment may be available to provide the desired cleaning or an undercut; however, a modification to an auger to carry out this operation will be described hereinafter. After the excavation or opening 4 is complete to the upper surface of the polyethylene pipe 10, the auger 6 is removed and modified, as will be described in greater detail hereinafter, to create an enlarged portion or undercut portion 5, as illustrated in FIG. 2. The dirt and debris around the exposed portion the polyethylene pipe 10 is moved to fully expose at least one-third (⅓) to one-half (½) of the polyethylene pipe 10, moving the dirt and debris which is not otherwise removed into the enlarged portion or undercut portion 5. This exposed portion of the surface of the polyethylene pipe 10, exposed to the opening 4, is cleaned. A brush or rag on a pole is used to provide a clean surface on the polyethylene pipe 10 for the fusing of a service connection to the new pipe. The fusing apparatus which includes a heating element 11, schematically illustrated in FIG. 2, is lowered so as to sit on the surface of the polyethylene pipe 10. The heating element 11 is illustrated as being mechanically movable from the upright position shown in FIG. 2 to a position on the surface of the polyethylene pipe 10 by a handle 12, operated from the surface. Alternately, a hydraulic system may be used to raise and lower the heating element 11. The heating element 11 sits on a saddle on the polyethylene pipe 10 which includes a hinge 13. The fusing apparatus also includes a supporting structure 14 for a saddle made of polyethylene or the end of a polyethylene pipe 15 which is at the end of a stack 16. The saddle or end of a polyethylene pipe 15 will be fused to the surface of the polyethylene pipe 10. The stack 16, supported and aligned over the polyethylene pipe 10 by sleeves and/or clamps 18 which are connected to and slidable on the supporting structure 14, is lowered into the opening 4. The clamps 18 may be mechanical, such as a cam which is tightened by pulling a lever upwardly at the surface and releasable by pushing the lever down by a rod from the surface. A preferred clamping system is a hydraulic system which will operate the clamps 18 as well as activate the heating element 11, raising or lowering as desired. The supporting structure 14 may be two or four rods on which the sleeves and/or clamps 18 are attached to align the stack 16 on the polyethylene pipe 10 and lower and raise the stack 16, as will be described in more detail hereinafter.

Referring now to FIG. 3, a side view in relation to the polyethylene pipe 10, also illustrates the step of introducing the fusing apparatus which includes the heating element 11 and the supporting structure 14 for the saddle or end of a polyethylene pipe 15 which is to be fused to the polyethylene pipe 10. Also a casing 20 may be introduced into the opening 4, as illustrated in FIG. 3, to prevent any cave-ins or dirt falling on the exposed polyethylene pipe 10 once the top of the pipe has been cleaned and the debris pushed into the undercut 5. A number of apparatus for fusing a stack 16 can be contemplated; however, a preferred embodiment includes the sleeves and/or clamps 18 supported by the four rods which position or align the stack 16 to the exposed surface of the polyethylene pipe 10 and once aligned the supporting structure 14 is made secure. One way to make the supporting structure 14 secure is to drive the rods into the dirt; however, it is also possible to use the exposed surface of the polyethylene pipe 10 such as using a collar on the pipe 10. The only movement desired is the raising and lowering of the stack 16, making certain there is no rotation of the stack 16 once the stack has been aligned.

The heating element 11 of the fusing apparatus is lowered as illustrated in FIG. 4 to heat the top surface of the polyethylene pipe 10 and the lower end 15 of the stack 16. The heating surface will have a temperature of about 500° F., the melting temperature of polyethylene. The lower end 15 of the stack 16 is a polyethylene saddle or the end of a polyethylene pipe having a nominal 4" or 6" diameter. The stack 16 may be a polyolefin such as polyethylene, polypropylene, polybutylene or a material such as polyvinylchloride (PVC). It is understood that the materials being fused, i.e. end 15 and pipe 10 are preferably both polyethylene. After heating the top surface of the polyethylene pipe 10 and the lower end 15 of the stack 16 to its molten state, usually less than five minutes, the stack 16 is first raised then the heating element 11 is raised to the positions shown in FIG. 3. The stack 16 is then quickly lowered to contact the top molten surface of the polyethylene pipe 10 where it is held under pressure to fuse the polyethylene end 15 of stack 16 and pipe 10 together, as illustrated in FIG. 5.

After the fusing is complete, which occurs upon the cooling of the molten interface between the end 15 of stack 16 and the top of pipe 10, a plug 30 is placed on the top of the stack 16 to test the fuse. Air is introduced into a line 32 to a pressure of between 3 and 10 psi. If the fuse between the stack 16 and the polyethylene pipe 10 is good the pressure will be maintained as indicated by pressure gauge 34. The test need only hold the pressure for a minute or less to test the fuse.

Only after the fusing of the stack 16 is complete, and preferably tested, is an opening cut into the polyethylene pipe 10. A circular saw 40, having a diameter just less than the internal diameter of the stack 16, so that the saw 40 can rotate and cut a plug from the pipe 10, is introduced through the stack 16 to cut an opening in the polyethylene pipe 10. A screw 42 which extends just below the saw teeth enters the surface and holds the plug cut from the polyethylene pipe 10 and allows the plug to be pulled up with the saw and not dropped into the pipe 10.

Figure 7:
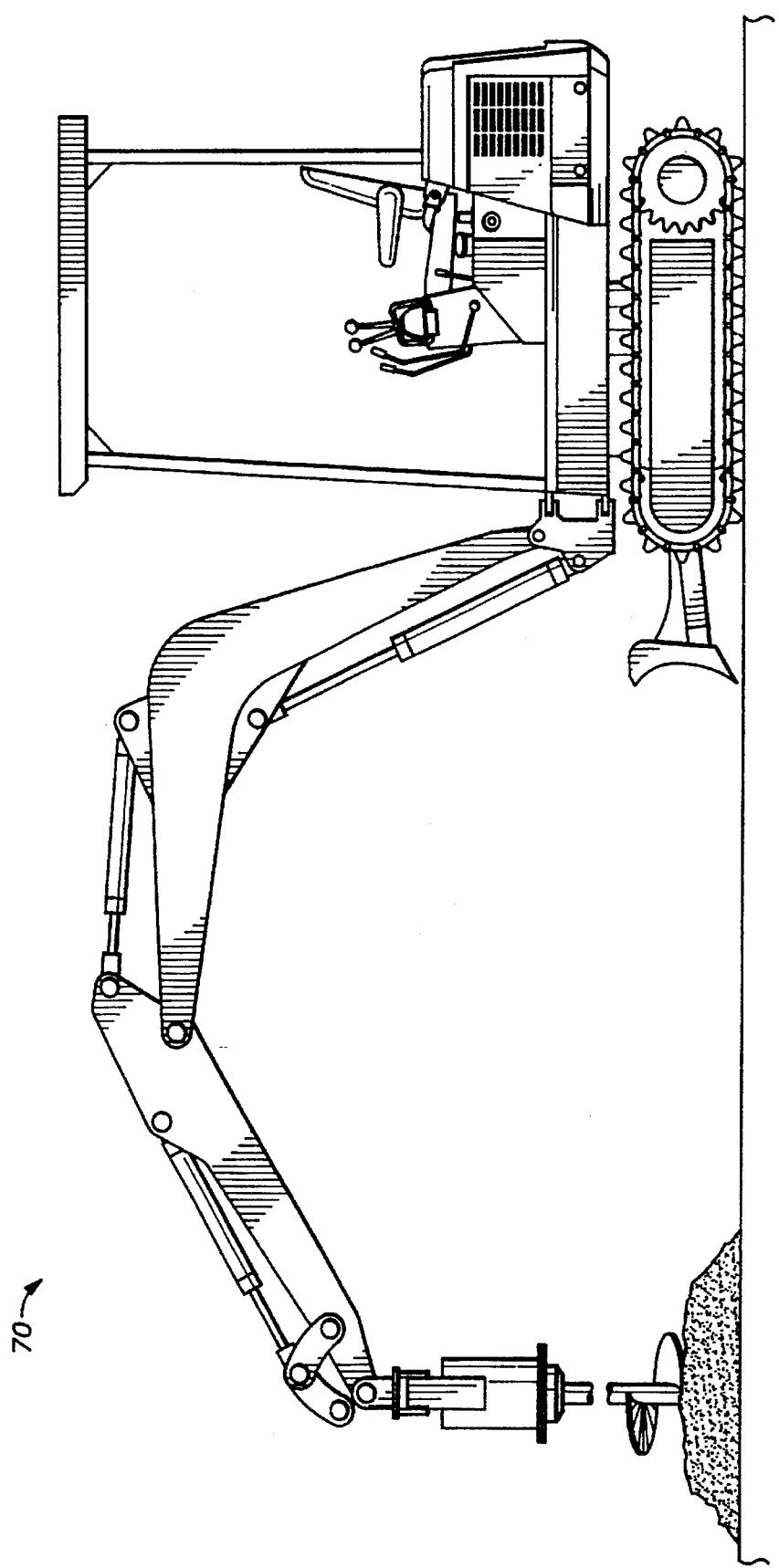
FIG. 7 shows the preferred excavator with auger attached to excavate to the top of the polyethylene pipe.

Referring now to FIGS. 7, the preferred excavator 70 is small enough to be easily placed through a four foot gate in the backyard of a house. The preferred excavator is a Kobota Excavator KX-41 which has a width of less than 42". This machine has the capabilities to use a 15" bucket to locate the service 4 and then power the auger 6. In addition the excavator 70 has power to attach a vacuum or suction system to remove the last amounts of dirt from the top of the polyethylene pipe 10.

Figure 8:
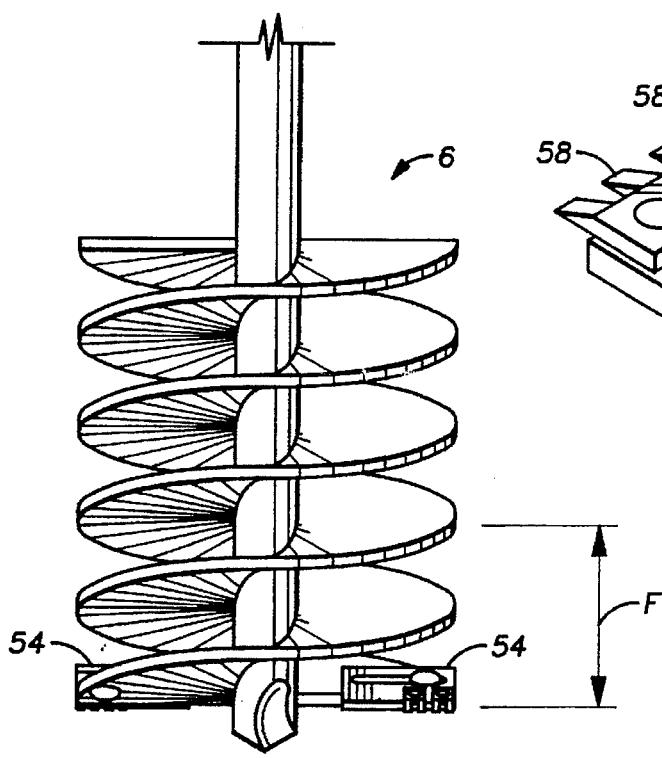
FIG. 8 shows the preferred auger with a modification which undercuts or enlarges the diameter of the opening.
Figure 9:
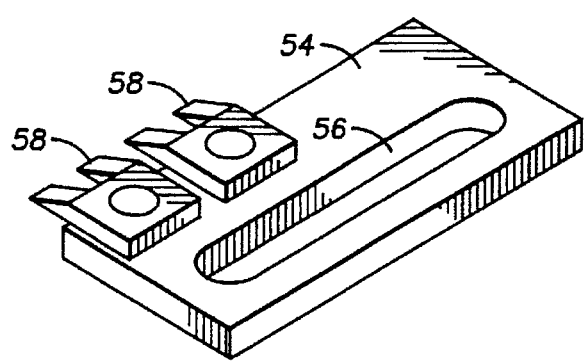
FIG. 9 shows the plate which is attached to the bottom flight of the auger to produce the enlarged diameter and clean the excavation just above the polyethylene pipe.

The preferred auger for the method of the present invention is illustrated in FIG. 8. The auger 6 may have only two to five flights (a flight being one rotation of the helix or "F" as illustrated in FIG. 8) and as shown is preferably a double helix auger. While this auger will require a number of rotations and removals of the auger in producing the opening 4, the amount of dirt removed is easily handled. The auger 6 is modified when the depth of the opening 4 is within inches above the polyethylene pipe 10. A plate 54, the details shown in FIG. 9, is placed on the bottom surfaces of the lowest flights of the auger 6. The plate 54 is held by a bolt or other attachment device secured to the lower flight of the auger 6 and passing through a slot 56 in each plate 54. Attached to the plate 54 are one or more pair of teeth 58 attached to the cutting edge of the plate 54. As the auger rotates the teeth 58 are caught by the wall of dirt and the plate 54 is pulled outwardly from the auger 6. The rotating plate 54 enlarges the diameter of the opening 4 or provides the undercut portion 5. This attachment may also break up the broken concrete sewer line when used with the slip line method of replacing the polyethylene pipe 10. This attachment is attached to the auger only after the opening 4 has been made to just above the polyethylene pipe 10. The loose dirt which the auger is unable to remove can be removed by a conventional, known suction device (not shown) powered by the excavator 70.

To provide fusing for all the applications where the method of the present invention may be used, a number of sizes or more specifically the surface radius of the heating elements are required. For example, when polyethylene pipe is used in the slip line replacement method, the outer diameter of a SDR21 7" polyethylene pipe is 7.125"; a SDR21 9" polyethylene pipe is 8.625"; and a SDR21 11" polyethylene pipe is 10.750", which are pulled through an 8", 10" and 12" broken line, respectively. On the other hand, if the polyethylene pipe is the result of a break in-place method of the broken pipe, a SDR17 8" polyethylene pipe (O.D.—8.625"); a SDR21 10" polyethylene pipe (O.D.—10.750"); or a SDR21 12" polyethylene pipe (O.D.—12.750") will be used. Since the heating element 11 must have the same radius as that of the outer surface of polyethylene pipe 10, more than one heating element is needed; for example, as many as six to handle the different possible size polyethylene pipe that will be used. It is understood that only one heating element is used with any polyethylene pipe but that size heating element has the same radius as that polyethylene pipe's outside diameter. The end 15 of the stack 16 whether a saddle or the end of a polyethylene pipe will have the same radius as the polyethylene pipe 10 to which it will be fused. For example, a preferred stack is a 4"

SDR17 polyethylene pipe which has an outside diameter (O.D.) of 4.5" and an inside diameter (I.D.) of 3.970". The end of the 4" pipe is cut to have the same radius as the polyethylene pipe 10 to which it is fused and the desired length provides the stack 16. To the upper end of the 4" pipe is inserted a common adapter, known as a Femco adapter, which connects the 4" pipe to conventional PVC pipe used in service lines. There are conventional lengths, elbows and pieces to complete the connection to the service line. Other 4" polyethylene pipe may be used and stacks may also be made from 6" pipe.

Figure 10:
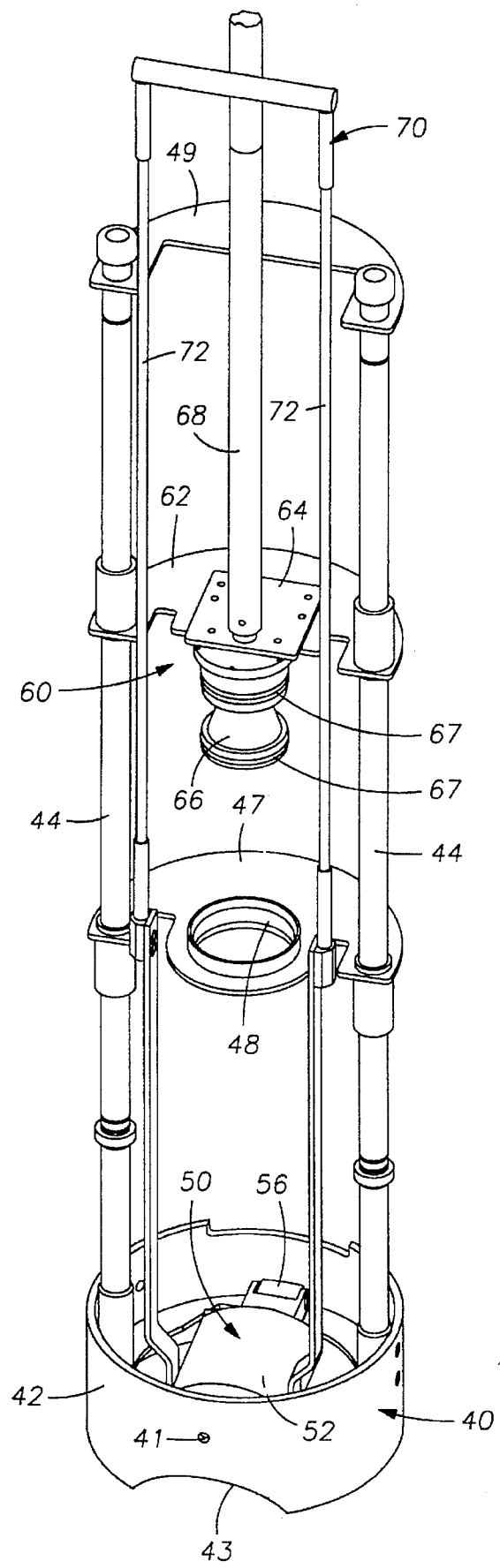
FIG. 10 is a perspective view of the down hole fusing apparatus of the present invention.
Figure 11:
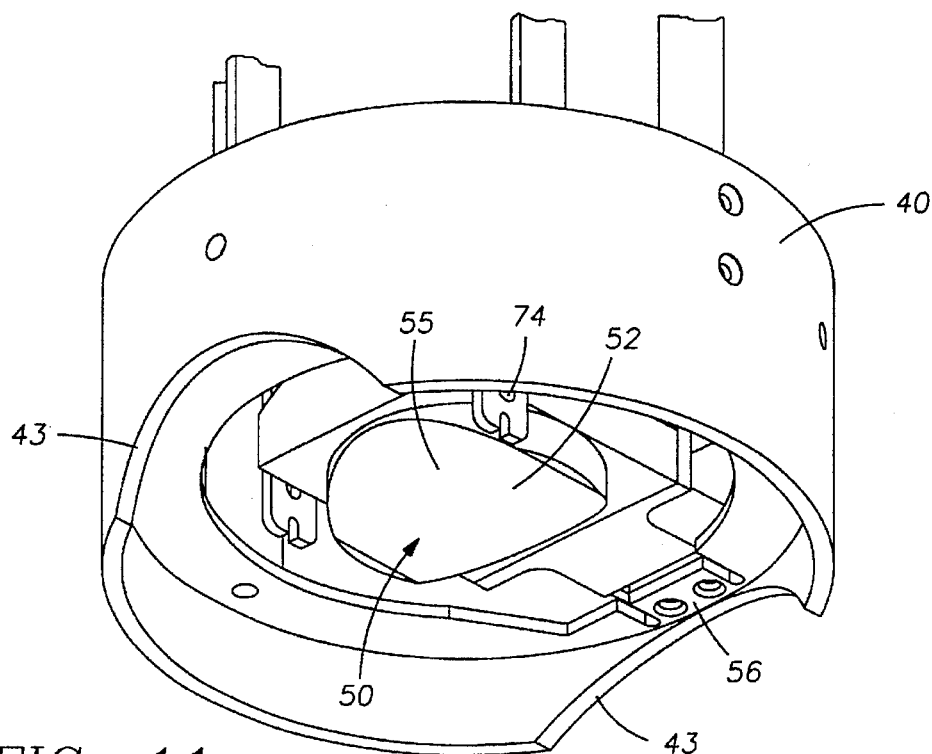
FIG. 11 is a perspective view from the bottom of the fusing apparatus of the present invention.
Figure 12:
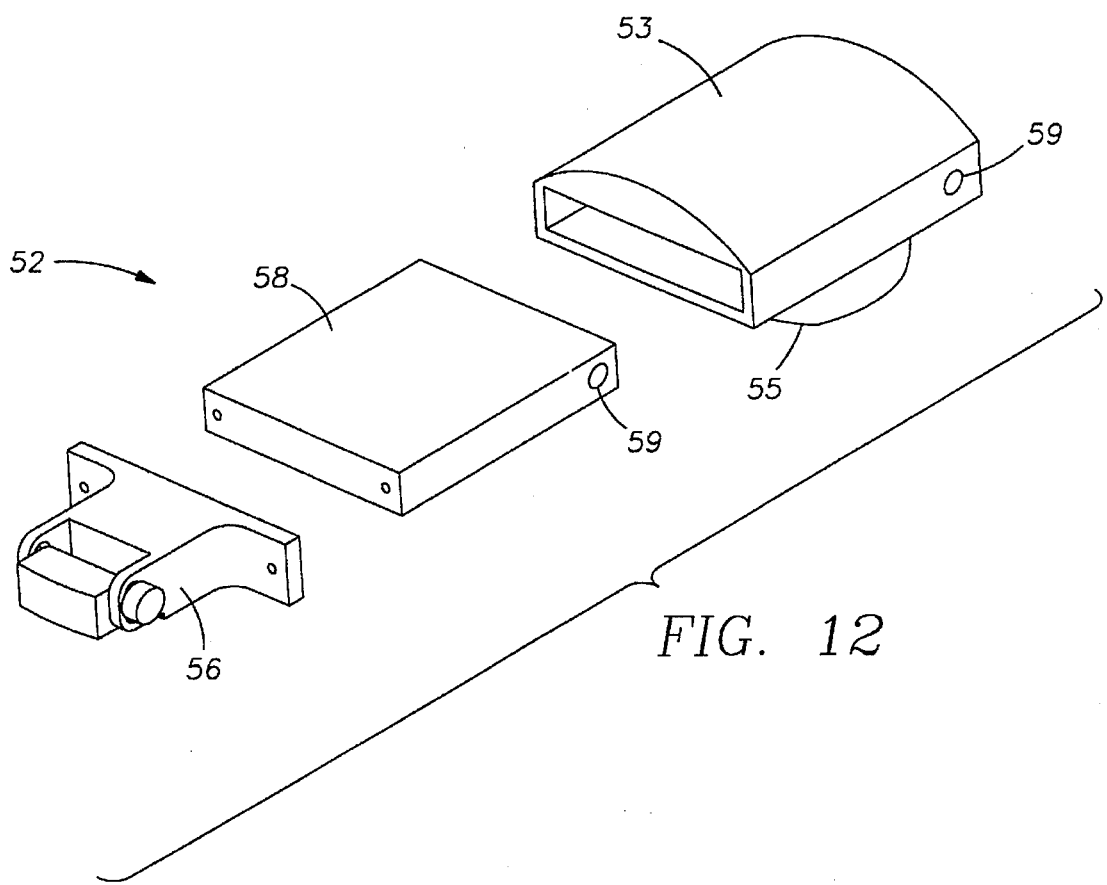
FIG. 12 is an exploded perspective view of the heating element of the fusing apparatus of the present invention.

Reference is now made to FIG. 10 which illustrates the preferred embodiment of the apparatus for down hole fusing used in the method heretofore set forth. The apparatus includes a base 40, a heating structure 50, a stack holder 60 and a mechanism 70 to move the iron of the heating structure 50. The base has a base saddle 42 with a radius 43 adapted to seat on the outside surface of polyolefin pipe 10. The base also has at least two adjustable support rods 44 extending from the saddle 42. When the saddle 42 is on the polyolefin pipe 10 the rods 44 are perpendicular to the pipe 10. The rods 44 are in sections so that the total length may be adjustable or the specific dimensions of certain sections may be changed. The heating structure 50 includes a heating iron 52. The heating iron 52 is machined aluminum having an upper surface 53 and lower surface 55 (see FIG. 11). The heating iron 52 is hinged to saddle 42 by a hinge 56. Referring now to exploded view of FIG. 12, the heating iron 52 has a heater 58 containing a plurality of resistor coils which will produce heat when a current is passed through the resistors connected to the hinge 56. The heater 58 slides inside the heating iron 52 and is attached by a screw in aligned threaded openings 59 of the heater 58 and heating iron 52. The axis of the hinge 56 is at a right angle or perpendicular to the axis of the polyolefin pipe 10. The upper surface 53 and the lower surface 55 have essentially the same radius as the outside surface of pipe 10. The stack holder 60 includes a lifting plate 62 which is movable upwardly and downwardly on support rods 44. Attached by a plate 64 is a cylindrical member 66 having a plurality of O-rings 67 around the perimeter which is inserted into the polyethylene stack (not shown, 16 in FIG. 2). The diameter of the O-rings 67 are such that there is sufficient friction when inserted into the stack that the stack is supported on and movable with the member 66 before the stack is fused. A tube 68 is attached to the lifting plate 62 and extends to the surface. By raising and lowering the tube 68 from the surface the stack is moved up and down. The mechanism 70 for moving the heating iron 52 on the hinge 56 is preferably a pair of flat rods 72. The rods 72 are attached on either side of the heating iron by bolts 74.

The down hole fusing apparatus is assembled by attaching sections of support rods 44 to the saddle 42. The radius 43 in the saddle 42 is the same as that of the pipe 10; however, if not, then a plate having the same radius as the pipe 10 (not shown) is bolted to each side of the saddle 43 using bolt openings 41 so that the saddle 43 will seat securely on the pipe 10. The selection of the first sections of support rods 44 is dependant on the height of the stack (16). A centralizing and stabilizing plate 47 is positioned between one-half and three-quarters of the height of the stack but no more than about one foot above the saddle 42. The centralizing and stabilizing plate 47 has an opening 48 with a diameter about that of the stack. This centralizing plate 47 makes certain that the stack is maintained perpendicular to the pipe 10 when in operation. An additional section of support rods 44 are added above plate 48. The lifting plate 62 is slidably mounted on this section of rods 44. The lifting plate 62 has hollow cylinders 69 and an opening in the plate 62 so that the plate 62 slides up and down on rods 44. Enough sections of rods 44 are attached to reach to the surface. At the end of the last section of rods 44, and if desired between a section, is a stabilizing plate 49. The stabilizing plate 49 is to maintain the base sufficiently for the lifting plate 62 to be raised and lowered while maintaining the stack in a perpendicular relationship with the pipe 10. As disclosed herein above, the pipe 10 may be at variable distances from the surface; however, when the down hole fusing apparatus is assembled at the surface the distance to the pipe 10 is known. Also known is the radius of the outer surface of the pipe 10. Accordingly, the heating iron 52 having faces 53 and 55 having essentially the same radius as the pipe 10 is attached to the saddle 42 by hinge 56. Sections of flat rods 72 are assembled, the first section attached to the sides of heating iron 52. A stack is forced on the cylindrical member 66 and the O-rings 67 hold the stack on the lifting plate 62. The end of the stack may rest on the top of heating iron 52 when the down hole fusing apparatus is lowered into position. The procedure for fusing as described herein above is then followed.

We claim:

1. A down hole fusing apparatus for fusing a polyolefin stack to a polyolefin pipe comprising:

a base which seats on said polyolefin pipe;

rods extending from said base to a centralizing plate with an opening in said centralizing plate;

a polyolefin stack holder means which moves on rods extending from said centralizing plate;

a heating element hinged to said base, said element having an upper surface and a lower surface each having a radius essentially that of a surface of said polyolefin pipe; and means for raising and lowering said heating element.

2. A down hole fusing apparatus according to claim 1 wherein said stack holder means includes:

a lifting, stabilizing plate which moves on said rods extending from said centralizing plate; and a polyolefin stack holder attached to said lifting plate.

3. A down hole fusing apparatus according to claim 1 wherein said means for raising and lowering said heater element are rods connected to each side of said heater element.

4. A down hole fusing apparatus according to claim 1 wherein said stack holder means further includes:

a hollow stack holder; and a pipe means for lifting said stack to move said heating element after heating the lower surface of said stack and test the stack after said stack is fused to said polyolefin pipe.

5. A down hole fusing apparatus for fusing a polyolefin stack to a polyolefin pipe comprising:

a base which seats on said polyolefin pipe;

rods extending from said base to a centralizing plate with an opening in said centralizing plate;

a polyolefin stack holder means which moves on rods extending from said centralizing plate;

extension rods which provide sufficient length to extend to a surface when said base is placed on said polyolefin pipe;

a heating element hinged to said base, said element having an upper surface and a lower surface each having a radius essentially that of a surface of said polyolefin pipe; and means for raising and lowering said heating element.

6. A down hole fusing apparatus according to claim 5 wherein said stack holder means further includes:

a hollow stack holder; and a pipe means for lifting said stack to move said heating element after heating the lower surface of said stack and test the stack after said stack is fused to said polyolefin pipe.

7. A down hole fusing apparatus for fusing a polyolefin stack to a polyolefin pipe which is underground comprising:

base means which seats on said polyolefin pipe and includes rods which extend perpendicular to said pipe;

heating means hinged to said base means, said heating means including a heating iron having an upper surface and a lower surface each having a radius essentially that of a surface of said polyolefin pipe;

stack holder means for positioning a stack on said heating iron to melt an end of said stack and lower said stack onto the surface of said polyolefin pipe to fuse the stack to said pipe; and means for raising and lowering said heating element from the surface of the ground.

* * * * *